(12) United States Patent
Kim et al.

(10) Patent No.: US 12,374,790 B2
(45) Date of Patent: Jul. 29, 2025

(54) ANTENNA DEVICE IMPLEMENTING SPATIAL-POLARIZATION SEPARATION OF BEAMS USING QUAD-POLARIZED ANTENNA MODULE ARRAY

(71) Applicant: KMW INC., Hwaseong-si (KR)

(72) Inventors: Duk Yong Kim, Yongin-si (KR); Young Chan Moon, Suwon-si (KR); Sung Hwan So, Hwaseong-si (KR); In Ho Kim, Yongin-si (KR); Oh Seog Choi, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 399 days.

(21) Appl. No.: 17/714,174

(22) Filed: Apr. 6, 2022

(65) Prior Publication Data

US 2022/0231412 A1 Jul. 21, 2022

Related U.S. Application Data

(63) Continuation of application No. PCT/KR2020/012942, filed on Sep. 24, 2020.

(30) Foreign Application Priority Data

Oct. 7, 2019 (KR) .......................... 10-2019-0123822
Dec. 10, 2019 (KR) .......................... 10-2019-0163933
Mar. 23, 2020 (KR) .......................... 10-2020-0034821

(51) Int. Cl.
*H01Q 3/30* (2006.01)
*H01Q 1/52* (2006.01)
*H01Q 15/24* (2006.01)
*H01Q 21/24* (2006.01)
*H01Q 21/26* (2006.01)
*H01Q 21/28* (2006.01)
*H01Q 25/00* (2006.01)
*H04B 7/06* (2006.01)
*H04B 7/10* (2017.01)

(52) U.S. Cl.
CPC ............... *H01Q 3/30* (2013.01); *H01Q 1/525* (2013.01); *H01Q 15/24* (2013.01); *H01Q 21/24* (2013.01);
(Continued)

(58) Field of Classification Search
CPC .......... H01Q 3/30; H01Q 15/24; H01Q 1/525; H01Q 21/24; H01Q 21/28; H01Q 25/001;
(Continued)

(56) References Cited

U.S. PATENT DOCUMENTS

| | | | | |
|---|---|---|---|---|
| 5,933,788 A | * | 8/1999 | Faerber | ..................... H04B 7/10 455/562.1 |
| 2015/0263435 A1 | * | 9/2015 | Song | ..................... H01Q 21/26 343/810 |

(Continued)

FOREIGN PATENT DOCUMENTS

| | | |
|---|---|---|
| CN | 103531919 A | 1/2014 |
| CN | 104600437 A | 12/2014 |

(Continued)

OTHER PUBLICATIONS

Extended European Search Report mailed Oct. 4, 2023 from the European Patent Office for European Application No. 20874273.4.

(Continued)

*Primary Examiner* — Dimary S Lopez Cruz
*Assistant Examiner* — Yonchan J Kim
(74) *Attorney, Agent, or Firm* — Insight Law Group, PLLC; Seung Lee

(57) ABSTRACT

An antenna device is disclosed for implementing spatial-polarization separation of beams using a quad-polarized antenna module array. The antenna device including a quad-polarized antenna module array including first and second quad-polarized antenna modules in which signal paths of radiating elements having the same polarization direction are coupled, and configured to radiate first and second beams having different polarizations, and a polarization/separation beamforming module configured to set
(Continued)

phases between signals to be different from each other so that the first beam and the second beam are spatially separated.

9 Claims, 16 Drawing Sheets

(52) U.S. Cl.
CPC ............. *H01Q 21/26* (2013.01); *H01Q 21/28* (2013.01); *H01Q 25/001* (2013.01); *H04B 7/0617* (2013.01); *H04B 7/10* (2013.01)

(58) Field of Classification Search
CPC .... H01Q 21/245; H01Q 21/26; H04B 7/0617; H04B 7/10; H04B 7/0491
See application file for complete search history.

(56) References Cited

U.S. PATENT DOCUMENTS

| | | | |
|---|---|---|---|
| 2015/0303589 A1* | 10/2015 | Bi | H01Q 21/24 343/893 |
| 2017/0301990 A1 | 10/2017 | Zhao et al. | |
| 2017/0353338 A1 | 12/2017 | Amadjikpe et al. | |
| 2020/0287298 A1* | 9/2020 | Ueda | H01Q 9/0407 |

FOREIGN PATENT DOCUMENTS

| | | |
|---|---|---|
| CN | 106170890 A | 11/2016 |
| JP | 2015-529991 A | 10/2015 |
| KR | 10-2010-0006948 A | 1/2010 |
| KR | 10-171171 B1 | 6/2017 |
| KR | 10-1751171 A | 6/2017 |
| KR | 101751171 B1 * | 6/2017 |
| KR | 10-2017-0097206 A | 8/2017 |
| WO | 2019/102869 A1 | 5/2019 |

OTHER PUBLICATIONS

Non-final Office Action mailed May 23, 2023 from the Japanese Patent Office for Japanese Application No. 2022-521000 and its English translation.
International Search Report mailed Dec. 23, 2020 for International Application No. PCT/KR2020/012942 and its English translation.
Chinese Office Action mailed on May 31, 2024 from the Chinese Patent Office for Chinese Application No. 202080070649.4 and its English translation.

* cited by examiner (A)

(B)

ANTENNA DEVICE IMPLEMENTING SPATIAL-POLARIZATION SEPARATION OF BEAMS USING QUAD-POLARIZED ANTENNA MODULE ARRAY

CROSS-REFERENCE TO RELATED APPLICATIONS

This application is a continuation application of International Application No. PCT/KR2020/012942, filed Sep. 24, 2020, which claims priority to and benefit of Korean Patent Application Nos. 10-2019-0123822 filed Oct. 7, 2019; 10-2019-0163933 filed Dec. 10, 2019; and 10-2020-0034821 filed on Mar. 23, 2020, the entire contents of which are incorporated herein by reference.

TECHNICAL FIELD

The present disclosure relates to an antenna device, and more particularly, to a quad-polarized antenna module capable of implementing temporal-polarization separation and improving area efficiency of an antenna module, and to an antenna device that performs spatial-polarization separation of beams using an array of the quad-polarized antenna modules.

BACKGROUND

The contents described in this section merely provide background information for the present disclosure and do not constitute the related art.

A frequency-division duplex (FDD) scheme and a time-division duplex (TDD) scheme have been used as a method of sharing transmitted/received signals using a single transmission line or an antenna.

An example of a conventional antenna device for sharing transmitted/received signals using a TDD scheme is illustrated in FIG. 1.

The conventional TDD type antenna device may be configured to include an antenna (ANT), a filter, a switch (S/W), a power amplifier (PA), a low noise amplifier (LNA), an AD converter (not illustrated) and, a digital signal processor (FPGA, not illustrated), and the like.

The TDD type antenna (ANT) may have a form in which a plurality of antenna modules are arrayed, and the antenna module may include radiating elements (dual-polarized antenna module) having a form of a dual-polarized antenna.

As illustrated in FIG. 2, the dual-polarized antenna module may include two radiating elements that have different polarization directions (set in different polarization directions). Each arrow indicates a radiating element, a direction of the arrow indicates a polarization direction of each radiating element, and a solid line box indicates a region or a space occupied by the antenna module.

The dual-polarized antenna module performs a signal transmission function when the switch (S/W) is connected to a transmission line (Tx line), and performs a signal reception function when the switch (S/W) is connected to a reception line (Rx line). That is, the dual-polarized antenna module (furthermore, the conventional TDD type antenna device) may implement the TDD function by a selective switching operation of the switch (S/W).

However, signal loss may occur in the transmitted signal (downlink signal) or the received signal (uplink signal) through a switching process, and signal loss may also occur while the received signal is transmitted to a rear stage in the device through a cable. Such a signal loss may cause problems of deteriorating the noise figure (NF) and limiting an uplink coverage extension of a wireless communication system.

In order to solve the above problems, a new antenna module of the TDD type in which a transmitting antenna module (Tx antenna module) and a receiving antenna module (Rx antenna module) are physically separated has been recently introduced.

An example of a new antenna module is illustrated in FIG. 3. In FIG. 3, the antenna module located on a left side indicates transmitting antenna modules (Tx1 and Tx2), the antenna module located on a right side indicates receiving antenna modules (Rx1 and Rx2), and the solid line box indicates a region or a space occupied by the entire new antenna module. Since the transmitting and receiving antenna modules are physically separated (since the transmission line and the reception line are configured separately), the new antenna module may solve some of the problems caused by conventional switching.

However, the new antenna module is physically separated into two different components to transmit and receive signals, differently from the conventional antenna module that the signal transmission and reception are performed at a single antenna module. Accordingly, the new antenna module may cause a problem in that an area of the antenna module itself increases.

In general, an antenna module array including a plurality of antenna modules is applied to an antenna device. The number of antenna modules included in the antenna module array is gradually increasing to implement a multiple-input multiple-output (MIMO) technology. Therefore, when the area or size of the antenna module itself increases like the new antenna module, the entire area or size of the antenna device as well as the antenna module array increases, which may cause difficulties in a process of installation or maintenance of the antenna device as well as in a process of producing the antenna device.

Meanwhile, the MIMO antenna module for mobile communication is generally designed as a plurality of dual-polarized antenna modules (dual-polarized antenna module array) in order to reduce the effect of multipath fading and perform a polarization diversity function.

As illustrated in FIG. 4, the fading refers to a phenomenon in which the strength of radio waves changes over time, and the diversity refers to a scheme of reducing the effect of fading by synthesizing several received signals having different electric field strength or signal output vs. noise output ratios to thereby obtain a single signal.

An example of the dual-polarized antenna module array is illustrated in FIG. 5. Each of the dual-polarized antennas of FIG. 5 may include a radiating element having a polarization direction of +45° and a radiating element having a polarization direction of −45°. Based on such an example, beam-forming (beam-pattern) through a dual-polarized antenna is illustrated in FIG. 6.

In FIG. 6, the dual-polarized antenna connected to the signal lines of TRx1 and TRx2 radiates a beam having a dotted line waveform, and the dual-polarized antenna connected to signal lines of TRx3 and TRx4 radiates a beam having a two-dot chain line waveform. As can be seen from FIG. 6, the beams radiated from the dual-polarized antenna have a wide beam shape, and the wide beam type beam has a low signal to noise ratio (SNR) due to the surrounding environment, and thus there is difficulty in transmitting a signal to a distant point.

A conventional method is to solve these problems by coupling the radiating elements in the dual-polarized antenna module array (by sharing signal paths) and separating a space (sector) for a signal of the same frequency (a signal of the same polarization).

For example, according to the conventional method, the signal of the same frequency is separated into three (FIG. 7A) or six (FIG. 7B) spaces and beam-formed. However, the conventional method may cause a problem in that since beams having the same polarization are arranged at adjacent positions, a correlation between the beams increases and thus communication quality deteriorates.

SUMMARY

Technical Problem

An object of an embodiment of the present disclosure is to provide a quad-polarized antenna module capable of reducing an area of an antenna module by unifying dual-polarized antenna modules, and addressing signal loss caused by switching by separating a transmitting antenna module and a receiving antenna module within the unified antenna module.

In addition, an object of another embodiment of the present disclosure is to provide an antenna device capable of transmitting a signal to a relatively distant point by coupling signal paths between radiating elements to radiate a narrow beam.

Moreover, an object of another embodiment of the present disclosure is to provide an antenna device capable of improving communication quality by setting polarizations between beams radiated from adjacent positions to be different from each other to reduce a correlation between the beams.

Technical Solution

According to an embodiment of the present disclosure, there is provided an antenna device for implementing spatial-polarization separation of beams, the antenna device including: a quad-polarized antenna module array including first and second quad-polarized antenna modules in which signal paths of radiating elements having the same polarization direction are coupled, and configured to radiate first and second beams having different polarizations; and a polarization/separation beamforming module configured to set phases between signals to be different from each other so that the first beam and the second beam are spatially separated, in which the first quad-polarized antenna module includes a first radiating element, a second radiating element having a polarization direction orthogonal to the first radiating element, a third radiating element having a difference in polarization direction of 45° with respect to the second radiating element, and a fourth radiating element having a polarization direction orthogonal to the third radiating element, and the second quad-polarized antenna module includes a fifth radiating element having the same polarization direction as the first radiating element, a sixth radiating element having the same polarization direction as the second radiating element, a seventh radiating element having the same polarization direction as the third radiating element, and an eighth radiating element having the same polarization direction as the fourth radiating element.

Advantageous Effects

As described above, according to the present disclosure, since a transmitting antenna module and a receiving antenna module are separated within a unified antenna module, signal loss caused by switching can be reduced.

In addition, according to the present disclosure, since physically separated dual-polarized antenna modules are unified into one quad-polarized antenna module, it is possible to reduce an area as well as provide convenience in manufacturing, installation, maintenance, and the like.

Moreover, according to the present disclosure, a narrow beam can be radiated, and as a result, a gain of an antenna can be improved. In addition, coverage can be expanded since beams can be separated in various directions in space. Furthermore, a correlation between the beams can be reduced by polarization separation of beams, and accordingly communication quality can be further improved.

DETAILED DESCRIPTION

Figure 1:
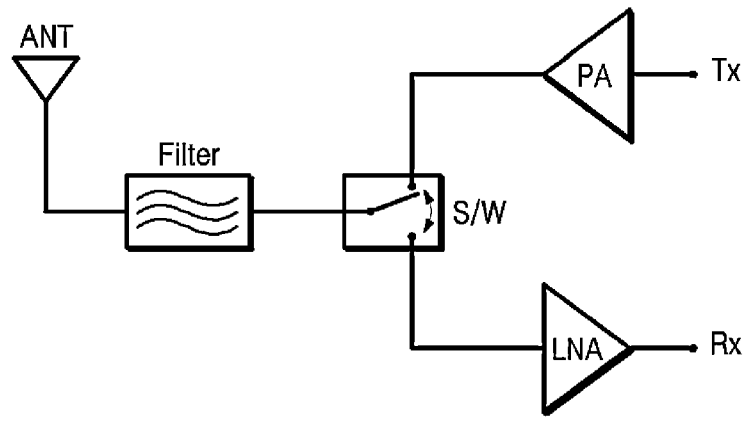
FIG. 1 is a block diagram illustrating an example of a conventional antenna device.
Figure 2:
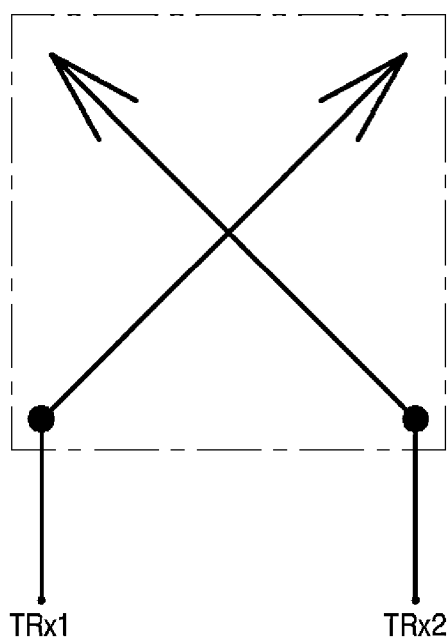
FIGS. 2 and 3 are diagrams for describing a conventional antenna module.
Figure 3:
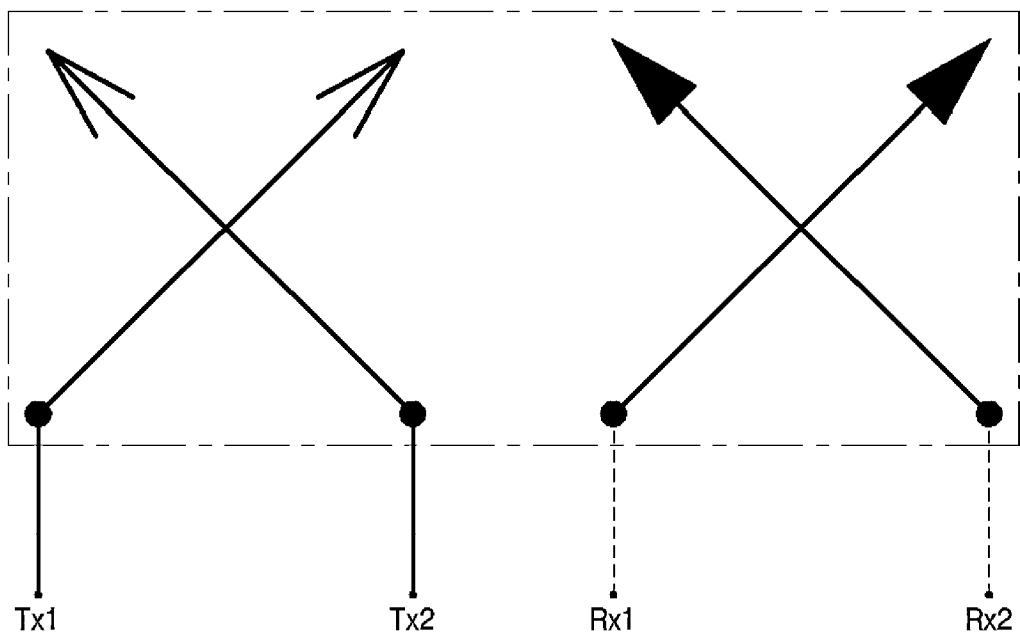
Figure 4:
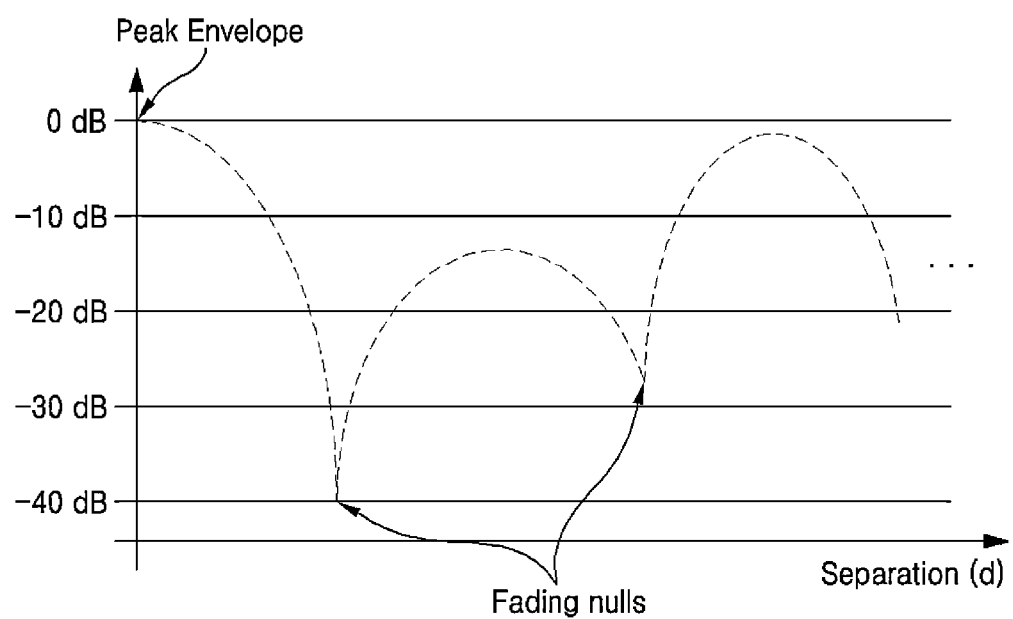
FIG. 4 is a diagram for describing a fading phenomenon.
Figure 5:
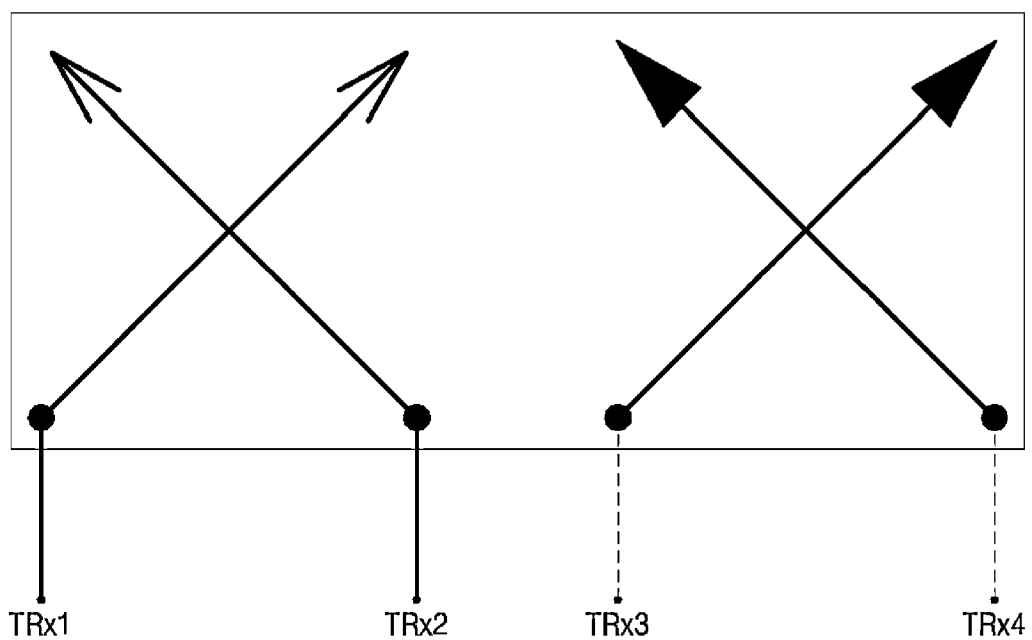
FIG. 5 is a diagram for describing a conventional antenna module array.
Figure 6:
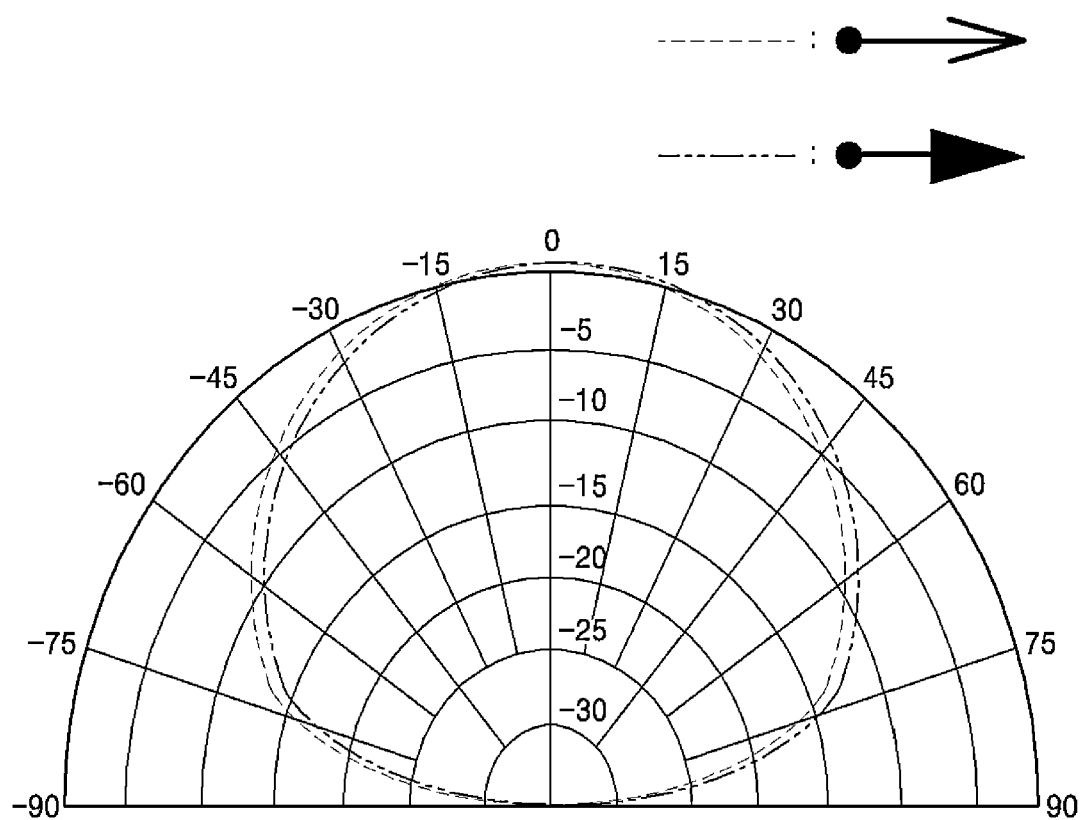
FIGS. 6 and 7 are diagrams for describing beams radiated through the conventional antenna module array.
Figure 7:
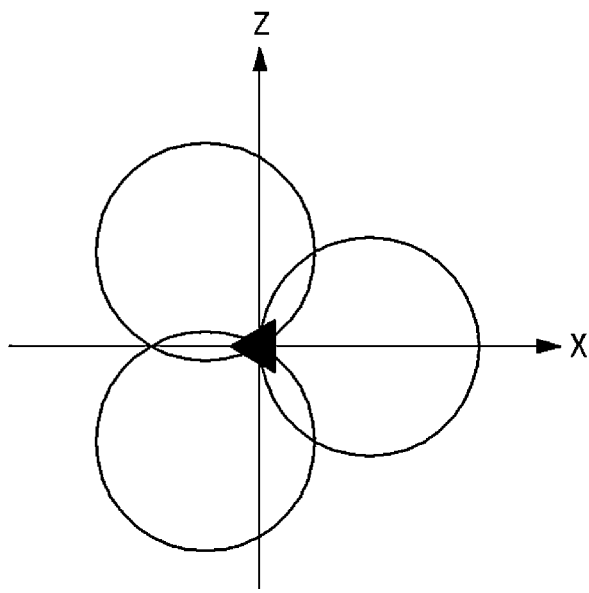
Figure 7:
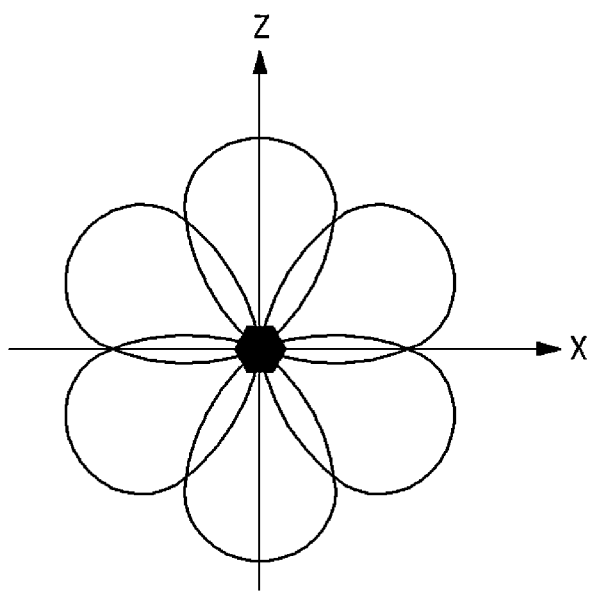

Hereinafter, exemplary embodiments of the present disclosure will be described in detail with reference to the accompanying drawings. It is to be noted that in giving reference numerals to components of the accompanying drawings, the same components will be denoted by the same reference numerals even though they are illustrated in different drawings. Further, in describing exemplary embodiments of the present disclosure, well-known functions or configurations will not be described in detail since they may unnecessarily obscure the understanding of the present disclosure.

In addition, terms first, second, A, B, (a), (b), and the like, will be used in describing components of exemplary embodiments of the present disclosure. These terms are used only in order to distinguish any component from other components, and features, sequences, or the like, of corresponding components are not limited by these terms. Throughout the present specification, unless explicitly described to the contrary, "including" and "comprising" any components will be understood to imply the inclusion of other elements rather than the exclusion of any other elements. A term "unit," "module," or the like, described in the specification means a unit of processing at least one function or operation and may be implemented by hardware or software or a combination of hardware and software.

In the present disclosure, 1) a quadruple (quad)-polarized antenna module capable of implementing temporal-polarization separation, and 2) an antenna device capable of implementing spatial-polarization separation are proposed. Hereinafter, 1) an embodiment of a first quad-polarized antenna module and 2) an embodiment of the antenna device will be separately described.

First Embodiment

In a first embodiment, a first quad-polarized antenna module 800 capable of implementing temporal-polarization separation is proposed.

Figure 8:
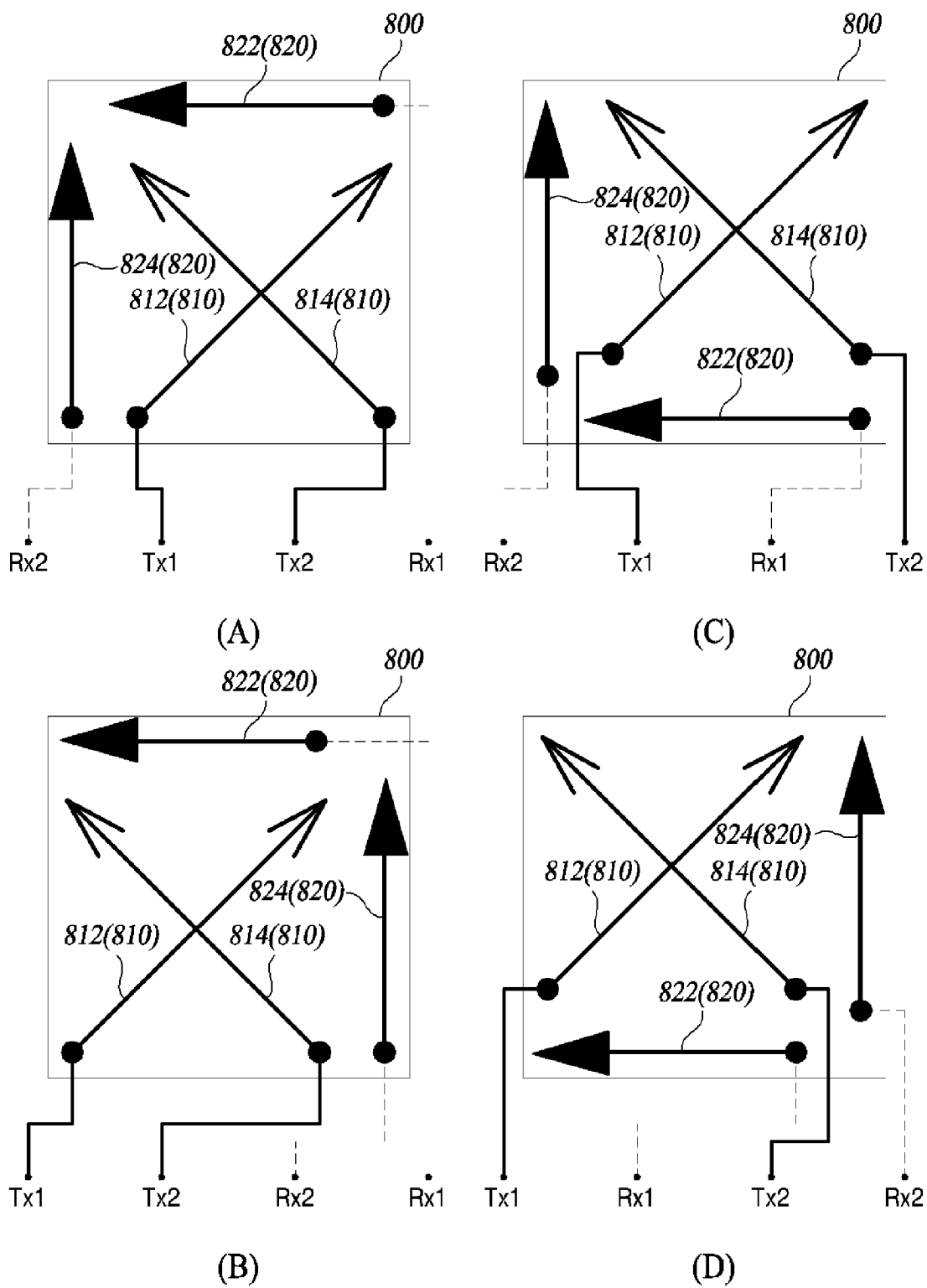
FIGS. 8 to 10 are diagrams for describing various examples of a quad-polarized antenna module.
Figure 9:
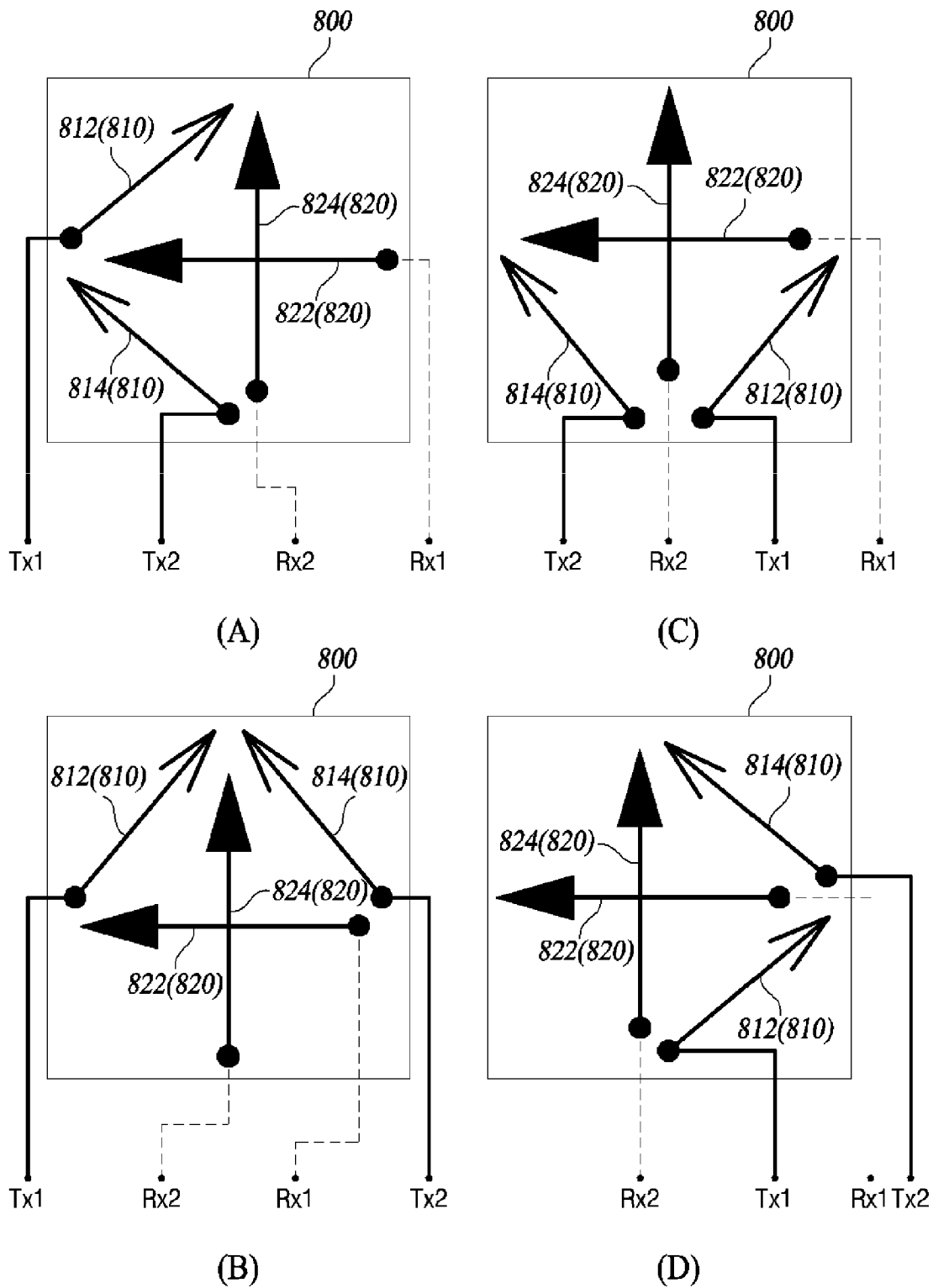
Figure 10:
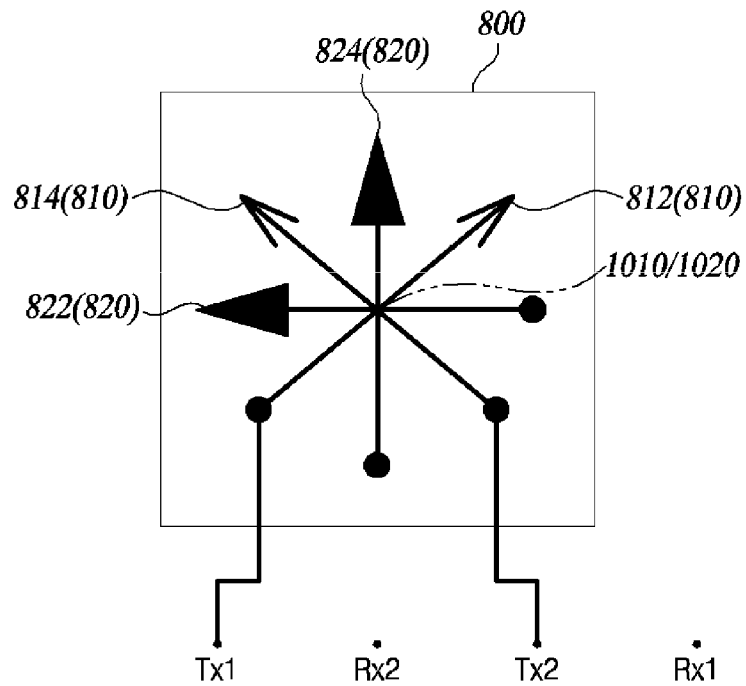

As illustrated in FIGS. 8 to 10, a first quad-polarized antenna module 800 may be configured to include a first radiating element module 810 and a second radiating element module 820.

The first radiating element module 810 may be configured to include two radiating elements 812 and 814 having polarization directions orthogonal or perpendicular to each other. A second radiating element module 820 may also be configured to include two radiating elements 822 and 824 having polarization directions orthogonal or perpendicular to each other.

Here, the "orthogonal" or "perpendicular" may include both a case in which polarization directions of the radiating elements have an angle difference of exactly 90° and a case in which the polarization directions of the radiating elements have an angle difference of 90°±θ. θ may vary depending on an error in a manufacturing process of the antenna module, a degree of correlation with other antenna modules, the need to adjust the beamforming direction, and the like.

One of the two radiating elements 812 and 814 included in the first radiating element module 810 is referred to as the first radiating element 812, and the other is referred to as the second radiating element 814. The second radiating element 814 may be set to have a polarization direction orthogonal or perpendicular to the polarization direction of the first radiating element 812.

One of the two radiating elements 822 and 824 included in the second radiating element module 820 is referred to as the third radiating element 822, and the other is referred to as the fourth radiating element 824. The third radiating element 822 may be set to have a difference in a polarization direction of 45° with respect to the polarization direction of the first radiating element 812.

The fourth radiating element 824 may be set to have a polarization direction orthogonal or perpendicular to the polarization direction of the third radiating element 822. The second radiating element 814 has a polarization direction relationship of being orthogonal or perpendicular to the first radiating element 812, and the first radiating element 812 has a polarization direction relationship of 45° with respect to the third radiating element 822, and the fourth radiating element 824 has a polarization direction relationship of being orthogonal or perpendicular to the third radiating element 822. Accordingly, the fourth radiating element 824 has a polarization direction relationship of 45° with respect to the first radiating element 812 and the second radiating element 814.

Here, the "polarization direction relationship of 45°" may include both the case in which the radiating elements have a difference in polarization direction of exactly 45° and the case in which the radiating element have a difference in polarization direction of 45°±θ. θ may vary depending on the error in the manufacturing process of the antenna module, the degree of correlation with other antenna modules, the need to adjust the beamforming direction, and the like.

According to the embodiment, the polarization direction of the radiating elements 812, 814, 822, and 824 may vary. For example, each of the first radiating element 812 and the second radiating element 814 may have polarization directions of +45° and −45°, and each of the third radiating element 822 and the fourth radiating element 824 may have vertical and horizontal polarizations. As another example, each of the first radiating element 812 and the second radiating element 814 may have vertical and horizontal polarization directions, and each of the third radiating element 822 and the fourth radiating element 824 may have polarization directions of +45° and −45°.

The first radiating element module 810 is connected to transmission lines Tx1 and Tx2 and used to transmit a signal, and the second radiating element module 820 is connected to reception lines Rx1 and Rx2 and used to receive a signal. Alternatively, the first radiating element module 810 is connected to the reception lines Rx1 and Rx2 and used to receive a signal, and the second radiating element module 820 is connected to the transmission lines Tx1 and Tx2 and used to transmit a signal.

As described above, in the first quad-polarized antenna module 800 of the present disclosure, since a radiating element module used to transmit a signal and a radiating element module used to receive a signal are separated from each other, the problem (signal loss) of the related art caused by a switch operation may be solved.

In addition, since the first quad-polarized antenna module 800 may use one of the first radiating element module 810 or the second radiating element module 820 for transmission and use the other of the first radiating element module 810 or the second radiating element module 820 for reception, temporal-polarization separation (signal transmission/reception and polarization separation) may be implemented.

Figure 11:
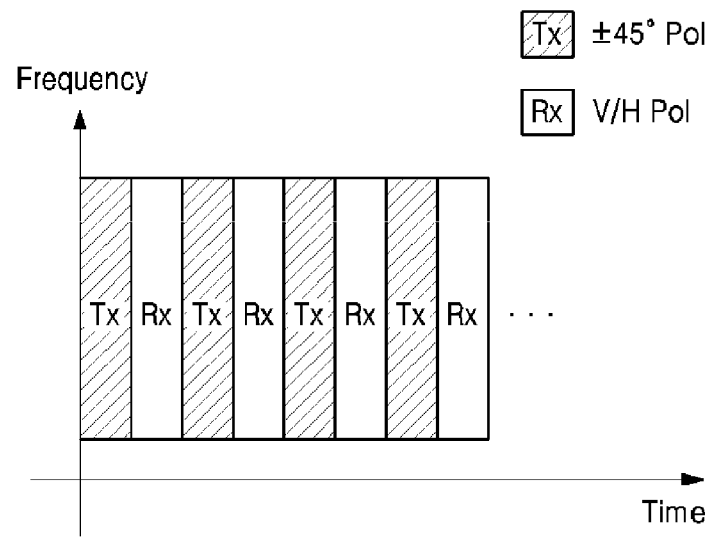
FIG. 11 is a diagram for describing an example of temporal-polarization separation using the quad-polarized antenna module.

An example of the temporal-polarization separation implemented using the first quad-polarized antenna module 800 is illustrated in FIG. 11.

In FIG. 11, a hatched region Tx indicates a time period in which a signal is transmitted through the first radiating element module 810 used for transmission, and a non-hatched region Rx indicates a time period in which a signal is received through the second radiating element module 820 used for reception.

Here, the two radiating elements 812 and 814 in the first radiating element module 810 have polarization directions of ±45° (±45° Pol.), and the two radiating elements 822 and 824 in the second radiating element module 820 have a vertical polarization direction and a horizontal polarization direction (V/H Pol.).

Hereinafter, embodiments capable of improving the area efficiency of the first quad-polarized antenna module 800 will be described. In the following embodiments, it is assumed that the first radiating element module 810 is connected to the transmission line and used to transmit a signal, and the second radiating element module 820 is connected to the reception line and used to receive a signal.

Embodiment 1-1

According to Embodiment 1-1, the third radiating element 822 and the fourth radiating element 824 are arranged around the first radiating element module 810.

As illustrated in FIG. 8, the first radiating element 812 and the second radiating element 814 may have different polarization directions, which are orthogonal or perpendicular to each other. The first radiating element 812 and the second radiating element 814 may be connected to transmission lines Tx1 and Tx2 to be used for signal transmission.

The third radiating element 822 may be arranged on an upper side (around an upper side) of the first radiating element module 810 (FIGS. 8A and 8B), or arranged on a lower side (around a lower side) of the first radiating element module 810 (FIGS. 8C and 8D).

The third radiating element 822 arranged on the upper side or the lower side of the first radiating element module 810 may have a difference in polarization direction of ±45° with respect to the first radiating element 812 and the second radiating element 814, and may be connected to a reception line Rx1 to be used for signal reception.

The fourth radiating element 824 may be arranged on a left side (around a left side) of the first radiating element module 810 (FIGS. 8A and 8C), or arranged on a right side (around the right side) of the first radiating element module 810 (FIGS. 8B and 8D).

The fourth radiating element 824 arranged on the left side or the right side of the first radiating element module 810 may have a polarization direction which is orthogonal or perpendicular to the third radiating element 822, and have a polarization direction of ±45° with respect to the first radiating element 812 and the second radiating element 814. The fourth radiating element 824 may be connected to a reception line Rx2 and used to receive a signal.

Embodiment 1-2

According to Embodiment 1-2, the first radiating element 812 and the second radiating element 814 are arranged around the second radiating element module 820.

As illustrated in FIG. 9, the third radiating element 822 and the fourth radiating element 824 may have different polarization directions, which are orthogonal or perpendicular to each other. The third radiating element 822 and the fourth radiating element 824 may be connected to reception lines Rx1 and Rx2 to be used for signal reception.

The first radiating element 812 may be arranged on an upper left side (around an upper left side) of the second radiating element module 820 (FIGS. 9A and 9B), or arranged on a lower right side (around a lower right side) of the second radiating element module 820 (FIGS. 9C and 9D).

The first radiating element 812 arranged on the upper left side or the lower right side of the second radiating element module 820 has a difference in polarization direction of ±45° with respect to the third radiating element 822 and the fourth radiating element 824, and may be connected to a transmission line Tx1 to be used for signal transmission.

The second radiating element 814 may be arranged on a lower left side (around a lower left side) of the second radiating element module 820 (FIGS. 9A and 9C), or arranged on an upper right side (around an upper right side) of the second radiating element module 820 (FIGS. 9B and 9D).

The second radiating element 814 arranged on the left side or the right side of the second radiating element module 820 may have a polarization direction which is orthogonal or perpendicular to the first radiating element 812, and have a difference in polarization direction of ±45° with respect to the third radiating element 822 and the fourth radiating element 824. The second radiating element 814 may be connected to the transmission line Tx2 and used to transmit a signal.

As described in Embodiments 1-1 and 1-2, the first quad-polarized antenna module 800 of the present disclosure may be configured so that the third radiating element 822 and the fourth radiating element 824 are arranged within a region (solid line box in FIG. 8) occupied by the first radiating element module 810, or configured so that the first radiating element 812 and the second radiating element 814 are arranged within a region (solid line box in FIG. 9) occupied by the second radiating element module 820.

Therefore, according to Embodiments 1-1 and 1-2, more improved area efficiency may be provided compared to the conventional method in which the transmitting antenna module and the receiving antenna module are arranged in two physically separated regions. In addition, the improvement in area efficiency may lead to convenience in manufacturing, installation, maintenance, and the like.

In Embodiment 1-1, the first radiating element 812 and the second radiating element 814 may be arranged in various forms. For example, the first radiating element 812 and the second radiating element 814 may be arranged to intersect each other. In addition, centers of each of the first radiating element 812 and the second radiating element 814 may be arranged to coincide each other. In this case, the area of the region (solid line box in FIG. 8) occupied by the first radiating element module 810 is minimized, and thus, area efficiency may be further increased.

In Embodiment 1-2, the third radiating element 822 and the fourth radiating element 824 may be arranged in various forms. For example, the third radiating element 822 and the fourth radiating element 824 may be arranged to intersect each other. In addition, centers of each of the third radiating element 822 and the fourth radiating element 824 may be arranged to coincide each other. In this case, the area of the region (solid line box in FIG. 9) occupied by the second radiating element module 820 is minimized, and thus, area efficiency may be further increased.

Embodiment 1-3

According to Embodiment 1-3, the first radiating element 812 and the second radiating element 814 are arranged to intersect each other, and the third radiating element 822 and the fourth radiating element 824 are also arranged to intersect each other.

As illustrated in FIG. 10, the first radiating element 812 and the second radiating element 814 may be arranged to intersect each other. A location or point at which the first radiating element 812 and the second radiating element 814 intersect each other is referred to as a "first intersection point 1010."

As illustrated in FIG. 10, the third radiating element 822 and the fourth radiating element 824 may be arranged to intersect each other. A location or point at which the third radiating element 822 and the fourth radiating element 824 intersect each other is referred to as a "second intersection point 1020."

An area (a solid line box in FIG. 10) occupied by the first quad-polarized antenna module 800 may be determined according to a distance between the first intersection point 1010 and the second intersection point 1020. As the distance between the first intersection point 1010 and the second intersection point 1020 increases, the area occupied by the first quad-polarized antenna module 800 may increase, and as the distance between the first intersection point 1010 and the second intersection point 1020 decreases, the area occupied by the first quad-polarized antenna module 800 may decrease.

In order to provide more improved area efficiency compared to the conventional method (the transmitting antenna module and the receiving antenna module are arranged in two physically separated areas), the distance between the first intersection point 1010 and the second intersection point 1020 is preferably less than or equal to a length of one radiating element.

In a range of a distance less than or equal to the length of one radiating element, the distance between the first intersection point 1010 and the second intersection point 1020 may be variously set according to a designer's intention or an arrangement relationship with other antenna modules constituting the antenna module array.

In order to maximize area efficiency, the first intersection point 1010 and the second intersection point 1020 may be arranged at the same location. That is, the area efficiency may be maximized when: the first radiating element 812 and the second radiating element 814 are arranged so that the centers of each of the first radiating element 812 and the second radiating element 814 coincide each other (at the first intersection point), the third radiating element 822 and the fourth radiating element 824 are also arranged so that the centers of each of the third radiating element 822 and the fourth radiating element 824 coincides each other (at the second intersection point), and the first intersection point 1010 and the second intersection point 1020 are arranged at the same location.

Second Embodiment

In a second embodiment, an antenna device capable of implementing spatial-polarization separation is proposed.

As described above, since beams radiated from the conventional dual-polarized antenna module array appear in the form of a wide beam having a low antenna gain, it is difficult to transmit a signal to a distant point. When the antenna modules are arranged in an array form and signal paths of the radiating elements are coupled, the form of a narrow beam may be derived and a signal may be transmitted to a distant point, but the following problems may occur.

1) Increase in size—In order to derive the form of the narrow beam, a plurality of radiating elements or a plurality of antenna modules need to be arranged, and thus the size of the antenna increases, resulting in reduced area efficiency.

2) Overlap occurs between adjacent beams, and thus the correlation between the polarizations of the beams is increased, resulting in deteriorated communication quality.

In the present disclosure, it is intended to propose a new antenna device capable of solving all of the above problems of the conventional antenna device described above.

Figure 12:
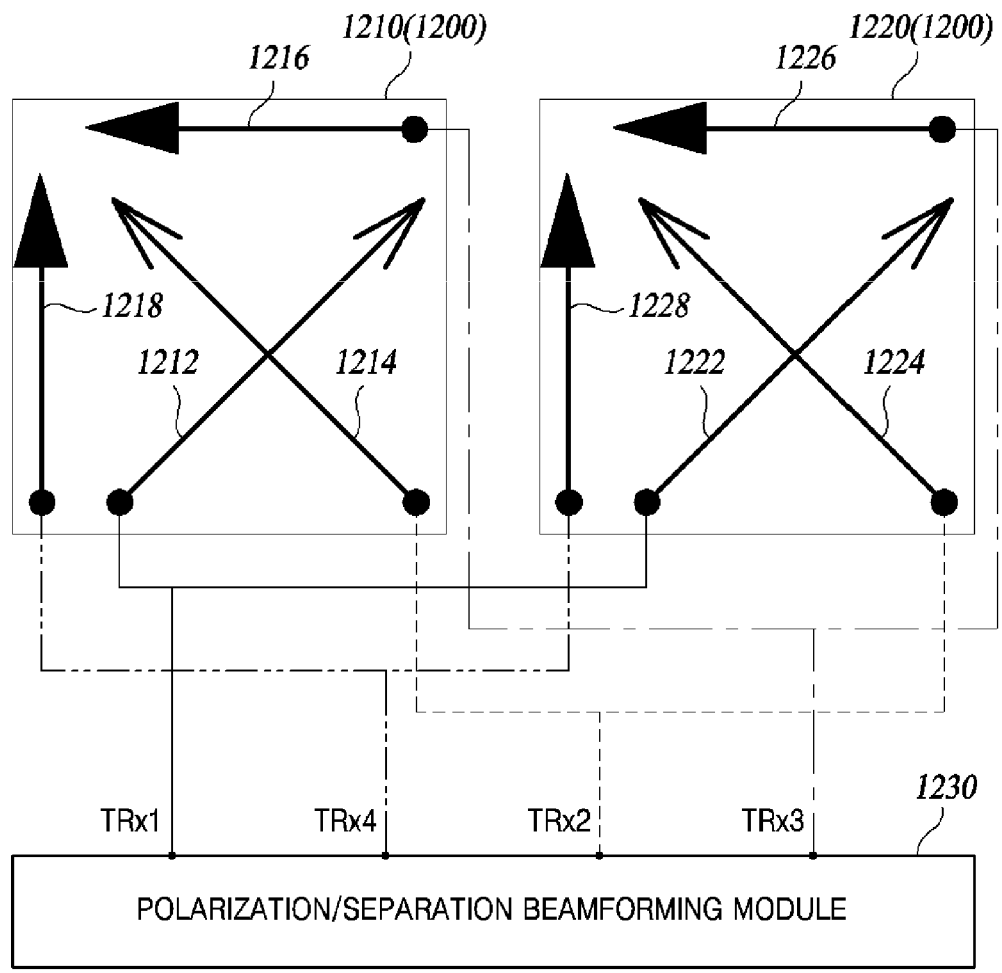
FIGS. 12 to 15 are diagrams for describing various examples of a quad-polarized antenna module array.

As illustrated in FIG. 12, the antenna device according to the present disclosure may be configured to include a quad-polarized antenna module array 1200 and a polarization/separation beamforming module 1230 (or a phase setting module).

The quad-polarized antenna module array 1200 is configured to radiate a plurality of beams using radiating elements included therein. The beams radiated through the quad-polarized antenna module array 1200 may have the form of a narrow beam, and two adjacent beams among these beams may have different polarization directions.

The quad-polarized antenna module array 1200 may be configured to include a plurality of quad-polarized antenna modules. In the present disclosure, it is assumed that the quad-polarized antenna module array 1200 is configured to include two quad-polarized antenna modules. One of the two quad-polarized antenna modules is referred to as a first quad-polarized antenna module 1210, and the other thereof is referred to as a second quad-polarized antenna module 1220.

The first quad-polarized antenna module 1210 may be configured to include first to fourth radiating elements 1212, 1214, 1216, and 1218 as described in the first embodiment.

The second radiating element 1214 may have a polarization direction orthogonal to the first radiating element 1212, the third radiating element 1216 may have a difference in polarization direction of 45° with respect to the polarization direction of the first radiating element 1212, and the fourth radiating element 1218 may have a polarization direction orthogonal to the third radiating element 1216. Since the third radiating element 1216 and the fourth radiating element 1218 have polarization directions orthogonal to each other, the fourth radiating element 1218 may also have, like the third radiating element 1216, a difference in polarization direction of 45° with respect to the polarization direction of the first radiating element 1212 and the second radiating element 1214.

The second quad-polarized antenna module 1220 may be configured to include fifth to eighth radiating elements 1222, 1224, 1226, and 1228 as described in the first embodiment.

The fifth radiating element 1222 may have the same polarization direction as the first radiating element 1212, the sixth radiating element 1224 may have the same polarization direction as the second radiating element 1214, the seventh radiating element 1226 may have the same polarization direction as the third radiating element 1216, and the eighth radiating element 1228 may have the same polarization direction as the fourth radiating element 1218.

Therefore, the sixth radiating element 1224 may have a polarization direction orthogonal to the fifth radiating element 1222, the seventh radiating element 1226 may have a difference in polarization direction of 45° with respect to the polarization directions of the fifth radiating element 1222 and the sixth radiating element 1224, and the eighth radiating element 1228 may have a polarization direction orthogonal to the seventh radiating element 1226. Since the seventh radiating element 1226 and the eighth radiating element 1228 have polarization directions orthogonal to each other, the eighth radiating element 1228 may also have, like the seventh radiating element 1226, a difference in polarization direction of 45° with respect to the polarization direction of the fifth radiating element 1222 and the sixth radiating element 1224.

Among the radiating elements included in the quad-polarized antenna module array 1200, signal paths of radiating elements having the same polarization direction may be coupled each other. For example, the first radiating element 1212 and the fifth radiating element 1222 may be coupled to a signal path TRx1, and the second radiating element 1214 and the sixth radiating element 1224 may be coupled to a signal path TRx2. In addition, the third radiating element 1216 and the seventh radiating element 1226 may be coupled to a signal path TRx3, and the fourth radiating element 1218 and the eighth radiating element 1228 may be coupled to a signal path TRx4. Beams radiated through the radiating elements of which the signal paths are coupled may have the form of a narrow beam.

Among the signal paths TRx1, TRx2, TRx3, and TRx4, frequencies of signals transmitted along the same signal path may be the same or different from each other. For example, when signals transmitted along the same signal path have different frequencies, communication providers may be distinguished using different frequencies. As another example, when signals transmitted along the same signal path have the same frequency, beams (beam-patterns) in various directions may be provided to the same communication provider using the same frequency. In the latter case, beams in various directions can cover a plurality of sectors throughout the coverage, and as a result, an effect of increasing the coverage can be obtained.

Beams radiated through the radiating elements may have polarization directions of the radiating elements from which the corresponding beams are radiated (polarization directions set in the radiating elements from which the corresponding beams are radiated). For example, beams radiated through the first radiating element 1212 and the fifth radiating element 1222 sharing TRx1 may have a polarization direction of +45°, and beams radiated through the second radiating element 1214 and the sixth radiating element 1224 sharing TRx2 may have a polarization direction of −45°. In addition, beams radiated through the third radiating element 1216 and the seventh radiating element 1226 sharing TRx3 may have a horizontal polarization direction, and beams radiated through the fourth radiating element 1218 and the eighth radiating element 1228 sharing TRx4 may have a vertical polarization direction.

Here, a beam having a polarization direction of ±45° may be referred to as a first beam, and a beam having a vertical polarization direction and a beam having a horizontal polarization direction may be referred to as a second beam (V/H).

The polarization/separation beamforming module 1230 may set phases between input signals (or transmitted signals) to be different from each other so that beams radiated through the quad-polarized antenna module array 1200 are spatially separated. The polarization/separation beamforming module 1230 may be implemented using a phase shifter or the like.

The signals whose phases are set differently through the polarization/separation beamforming module 1230 are input to the quad-polarized antenna module array 1200 through the coupled signal paths TRx1, TRx2, TRx3, and TRx4, and are spatially separated according to the phase and radiated in the form of a beam. In this case, since the beams are radiated in a state in which the beams have the polarization direction of the radiating element, two beams adjacent to each other in space may have different polarizations.

Embodiment 2-1: Improvement in Area Efficiency (Reduction in Antenna Size)

Embodiment 2-1 relates to a method of improving area efficiency by efficiently arranging radiating elements to reduce the size of the quad-polarized antenna module array 1200. As the method of improving area efficiency, the method of improving area efficiency of a quad-polarized antenna module described in Embodiment 1 may be applied.

For example, as illustrated in FIG. 12, the third radiating element 1216 may be arranged on an upper side of the first radiating element 1212 and the second radiating element 1214, and the fourth radiating element 1218 may be arranged on a right side or a left side of the first radiating element 1212 and the second radiating element 1214. With this arrangement, the seventh radiating element 1226 may be arranged on an upper side of the fifth radiating element 1222 and the sixth radiating element 1224, and the eighth radiating element 1228 may be arranged on a right side or a left side of the fifth radiating element 1222 and the sixth radiating element 1224.

As another example, the third radiating element 1216 may be arranged on a lower side of the first radiating element 1212 and the second radiating element 1214, and the fourth radiating element 1218 may be arranged on the right side or the left side of the first radiating element 1212 and the second radiating element 1214. With this arrangement, the seventh radiating element 1226 may be arranged on a lower side of the fifth radiating element 1222 and the sixth radiating element 1224, and the eighth radiating element 1228 may be arranged on the right side or the left side of the fifth radiating element 1222 and the sixth radiating element 1224.

Figure 14:
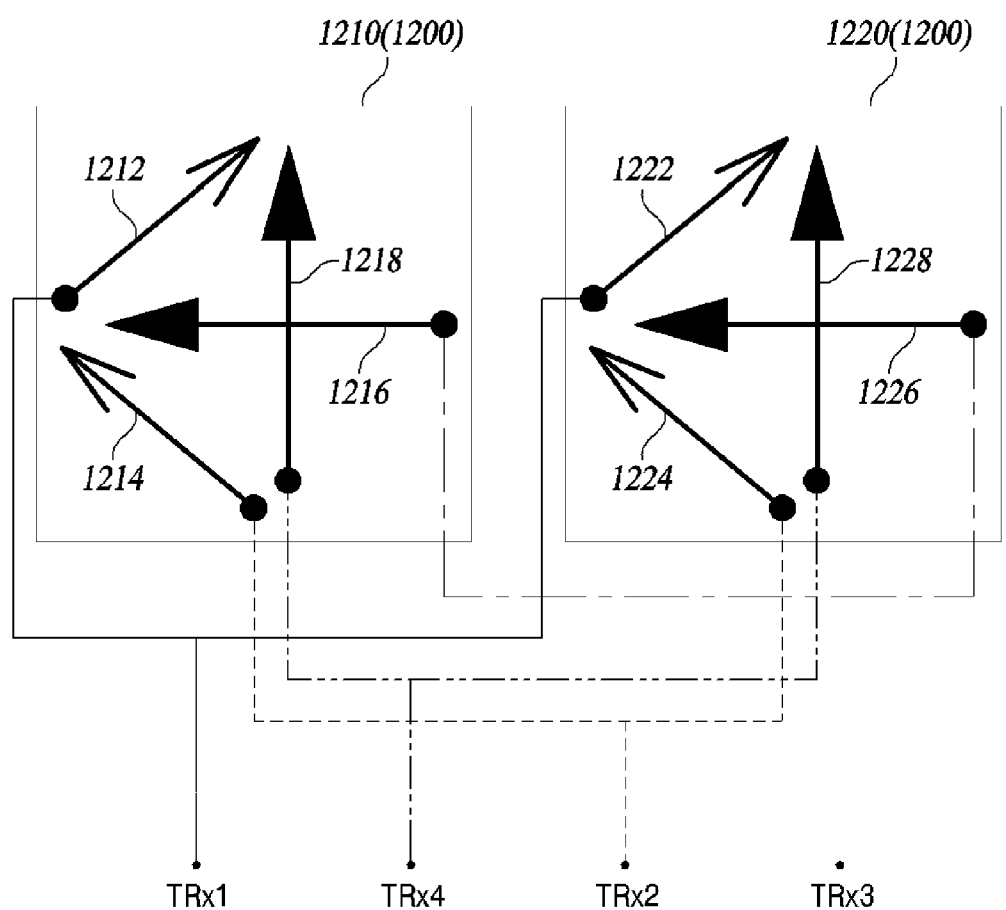

As another example, as illustrated in FIG. 14, the first radiating element 1212 may be arranged on an upper left side of the third radiating element 1216 and the fourth radiating element 1218, and the second radiating element 1214 may be arranged on an upper right side or a lower left side of the third radiating element 1216 and the fourth radiating element 1218. With this arrangement, the fifth radiating element 1222 may be arranged on an upper left side of the seventh radiating element 1226 and the eighth radiating element 1228, and the sixth radiating element 1224 may be arranged on an upper right side or a lower left side of the seventh radiating element 1226 and the eighth radiating element 1228.

As another example, the first radiating element 1212 may be arranged on a lower right side of the third radiating element 1216 and the fourth radiating element 1218, and the second radiating element 1214 is arranged on an upper right side or a lower left side of the third radiating element 1216 and the fourth radiating element 1218. With this arrangement, the fifth radiating element 1222 may be arranged on a lower right side of the seventh radiating element 1226 and the eighth radiating element 1228, and the sixth radiating element 1224 may be arranged on an upper right side or a lower left side of the seventh radiating element 1226 and the eighth radiating element 1228.

Figure 15:
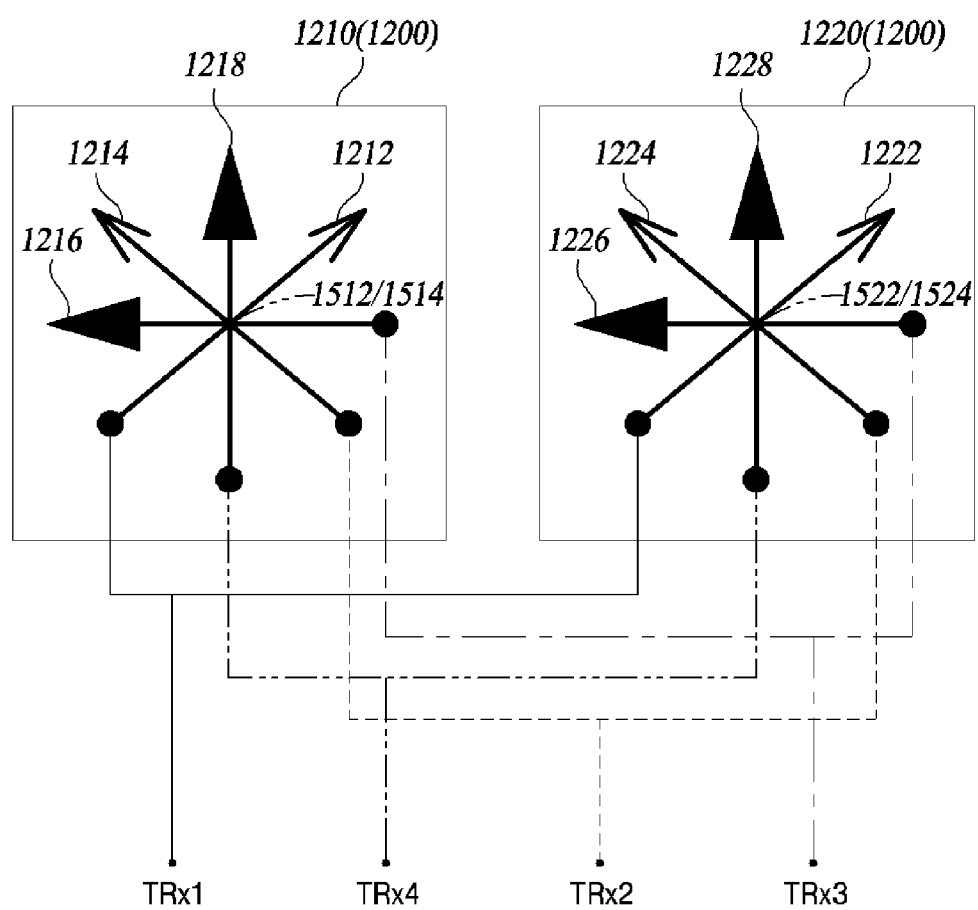

As another example, as illustrated in FIG. 15, the first radiating element 1212 and the second radiating element 1214 may be arranged to intersect each other, and the third radiating element 1216 and the fourth radiating element 1218 may be arranged to intersect each other. With this arrangement, the fifth radiating element 1222 and the sixth radiating element 1224 may be arranged to intersect each other, and the seventh radiating element 1226 and the eighth radiating element 1228 may be arranged to intersect each other.

Here, a location or point at which the first radiating element 1212 and the second radiating element 1214 intersect each other is referred to as a first intersection point 1512, and a location or point at which the third radiating element 1216 and the fourth radiating element 1218 intersect each other is referred to as a second intersection point 1514. In addition, a location or point at which the fifth radiating element 1222 and the sixth radiating element 1224 intersect each other is referred to as a third intersection point 1522, and a location or point at which the seventh radiating element 1226 and the eighth radiating element 1228 intersect each other is referred to as a fourth intersection point 1524.

Like Embodiment 1-3, when a distance between the first intersection point 1512 and the second intersection point 1514 is minimized, the efficiency of the area occupied by the first quad-polarized antenna module 1210 may be maximized, and, when the distance between the third intersection point 1522 and the fourth intersection point 1524 is minimized, the efficiency of the area occupied by the second quad-polarized antenna module 1220 may be maximized. Therefore, in order to maximize the area efficiency, the first intersection point 1512 and the second intersection point 1514 may be located at the same position, and the third intersection point 1522 and the fourth intersection point 1524 may also be located at the same position.

Meanwhile, the first quad-polarized antenna module 1210 and the second quad-polarized antenna module 1220 may be arranged at various locations. For example, the first quad-polarized antenna modules 1210 and 1220 may be arranged in a horizontal direction (transverse direction), a vertical direction (longitudinal direction), or a diagonal direction.

When the first and second quad-polarized antenna modules 1210 and 1220 are arranged in the horizontal direction, the first quad-polarized antenna module 1210 may be arranged on the left side and the second quad-polarized antenna module 1220 may be arranged on the right side, or the first quad-polarized antenna module 1210 may be arranged on the right side and the second quad-polarized antenna module 1220 may be arranged on the left side.

When the first and second quad-polarized antenna modules 1210 and 1220 are arranged in the vertical direction, the first quad-polarized antenna module 1210 may be arranged on the upper side and the second quad-polarized antenna module 1220 may be arranged on the lower side, or the first quad-polarized antenna module 1210 may be arranged on the lower side and the second quad-polarized antenna module 1220 may be arranged on the upper side. Among the radiating elements 1212, 1214, 1216, 1218, 1222, 1224, 1226, and 1228, the radiating elements arranged in the vertical direction may be arranged at different locations with respect to the horizontal direction.

Figure 13:
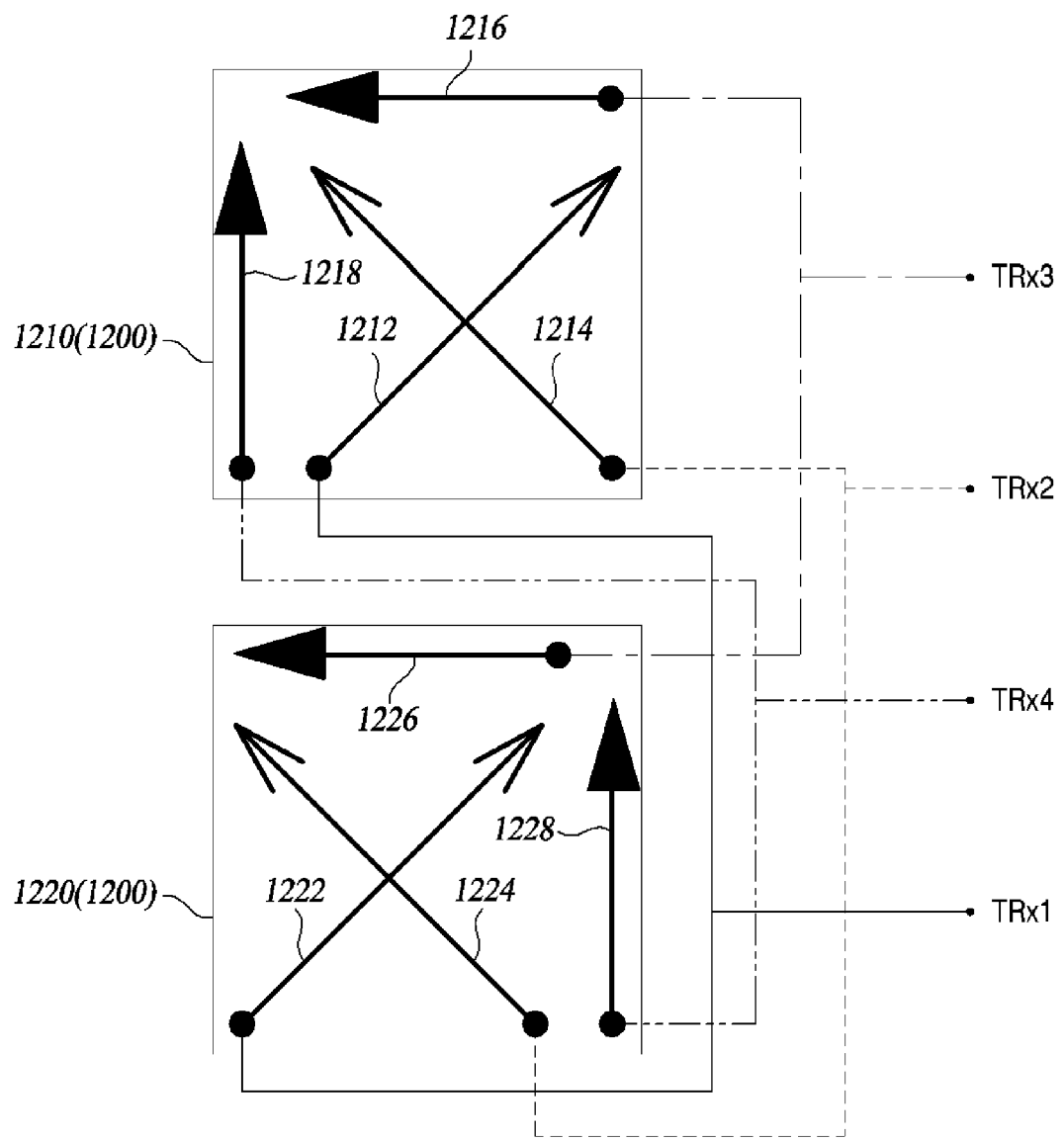

For example, as illustrated in FIG. 13, when the first quad-polarized antenna module 1210 is arranged on the upper side and the second quad-polarized antenna module 1220 is arranged on the lower side, the fourth radiating element 1218 and the eighth radiating elements 1228 are arranged in the vertical direction. In this case, the fourth radiating element 1218 and the eighth radiating element 1228 may be arranged at different locations (opposite locations) with respect to the horizontal direction. That is, the fourth radiating element 1218 may be arranged on the left side of the first radiating element 1212 and the second radiating element 1214, and the eighth radiating element 1228 may be arranged on the right side of the fifth radiating element 1222 and the sixth radiating element 1224. Alternatively, the fourth radiating element 1218 may be arranged on the right side of the first radiating element 1212 and the second radiating element 1214, and the eighth radiating element 1228 may be arranged on the left side of the fifth radiating element 1222 and the sixth radiating element 1224.

The reason why the radiating elements arranged in the vertical direction are arranged at different locations with respect to the horizontal direction is to form a narrow beam (a narrow beam having a preset radiation angle) having a sufficient gain.

The gain of the beam depends on the horizontal length of the radiating element. Since the third radiating element 1216 and the seventh radiating element 1226 are arranged in the horizontal direction, a narrow beam having a sufficient gain by itself can be radiated. In contrast, since the fourth radiating element 1218 and the eighth radiating element 1228 are arranged in the vertical direction, the horizontal length is very short and thus it may be difficult to radiate a narrow beam having a sufficient gain.

Therefore, for forming a narrow beam having a sufficient gain, the fourth radiating element 1218 and the eighth radiating element 1228 may be arranged at locations symmetrical to each other, and a distance between the fourth radiating element 1218 and the eighth radiating element 1228 serves as the horizontal length of the radiating element.

Embodiment 2-2: Spatial-Polarization Separation Between Beams

Embodiment 2-2 relates to a method of separating and radiating beams in space (spatial separation) to improve a correlation between the beams, and differently setting polarizations between beams adjacent to each other among the spatially separated beams (polarization separation).

The polarization/separation beamforming module 1230 may set the phase or angle of the input signals so that the beams are separated from each other in space. For example, the polarization/separation beamforming module 1230 may set, among the input signals, the phase of the signals input to TRx1 and TRx2 and the phase of the signals input to TRx3 and TRx4 to be different from each other.

Signals set to different phases are radiated through the radiating elements 1212, 1214, 1216, 1218, 1222, 1224, 1226, and 1228. In this case, the signals set to different phases are to be radiated in the form of a beam having a polarization direction set in each radiating element.

For example, the signal input to TRx1 may be radiated as a beam having a polarization direction of +45° by the first radiating element 1212 and the fifth radiating element 1222, and the signal input to TRx2 may be radiated as a beam having a polarization direction of −45° by the second radiating element 1214 and the sixth radiating element 1224 (first beam). In addition, the signal input to TRx3 may be radiated as a beam having a horizontal polarization direction by the third radiating element 1216 and the fifth radiating element 1226, and the signal input to TRx4 may be radiated as a beam having a vertical polarization direction by the second radiating element 1218 and the eighth radiating element 1228 (second beam).

Spatial-Polarization Separation in Horizontal Direction

The polarization/separation beamforming module 1230 may set the phases of the input signals to be different from each other in the horizontal direction. When the phases of the signals are set differently in the horizontal direction, the beams radiated through the quad-polarized antenna module array 1200 may be spatially separated in the horizontal direction.

Figure 16:
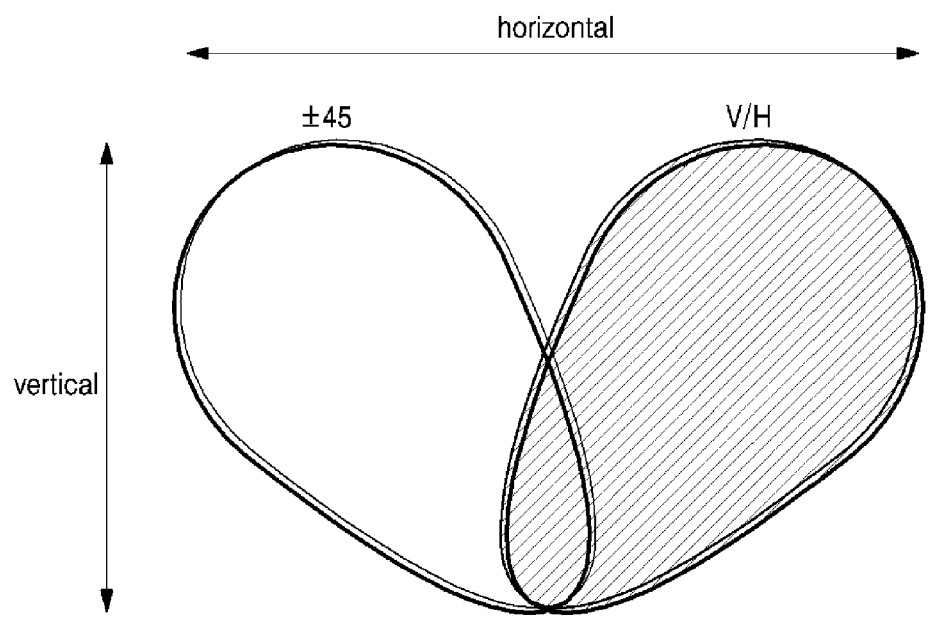
FIGS. 16 to 18 are diagrams for describing spatial-polarization separation in a horizontal direction.

An example of the spatial-polarization separation of beams in the horizontal direction is illustrated in FIG. 16. A beam having a polarization direction of ±45° represents the first beam, and a beam having a polarization direction of V/H represents the second beam. Referring to FIG. 16, it can be seen that beams (the first beam and the second beam) having different polarizations or polarization directions are separated and radiated in a horizontal direction in space by the antenna device of the present disclosure.

Figure 17:
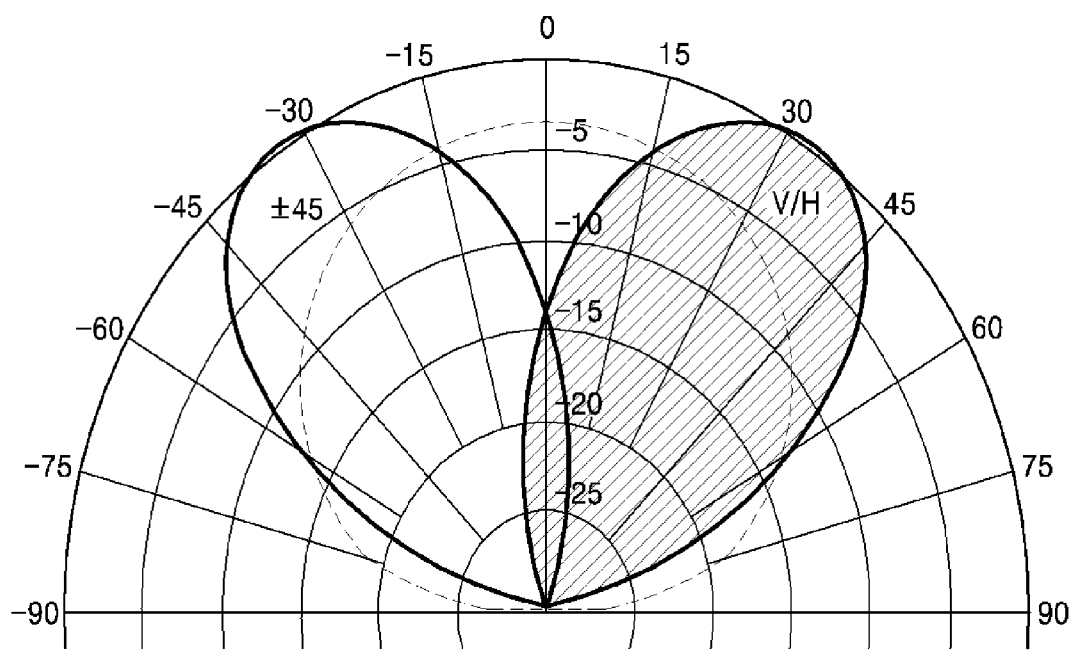

FIG. 17 illustrates a comparison between the spatial-polarization separated beams by the antenna device of the present disclosure and the beams by the conventional antenna device.

In FIG. 17, a dotted line waveform represents the beam by the conventional antenna device, and a waveform expressed as a non-hatched pattern among waveforms indicated by a solid line represents the first beam)(±45° radiated by the antenna device of the present disclosure, and a waveform expressed as a hatched pattern represents the second beam (V/H) radiated by the antenna device of the present disclosure.

It is seen from FIG. 17 that, according to the antenna device of the present disclosure, the spatial-polarization separation of beams in the horizontal direction can be implemented and more improved antenna gain can be obtained compared to the conventional method. In addition, it is seen that sectors (spaces) are separated and thus the coverage can be increased.

Figure 18:
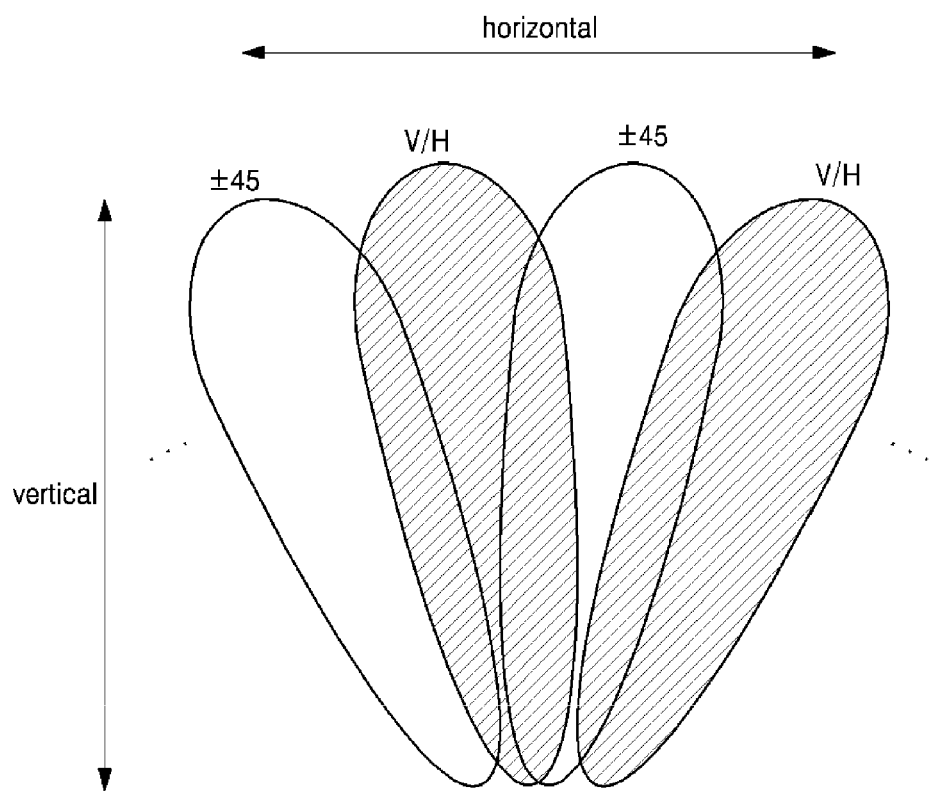

Furthermore, although there is an overlapping region between beams radiated by the antenna device of the present disclosure, the polarizations between the beams are different (polarization separation). Therefore, the correlation problem between the signals can be solved. FIG. 18 illustrates the effect of the polarization separation in more detail.

In order from a left space toward a right space, the first beam having a polarization direction of ±45° and the second beam having a polarization direction of V/H are alternately radiated. Therefore, the correlation between the two adjacent beams can be sufficiently small. This characteristic is also established between the second and third beams and between the third and fourth beams.

Although the first and third beams both have a polarization direction of ±45°, since both the first and third beams are sufficiently far apart (spaced apart) from each other, the correlation between the two beams can be sufficiently small. This characteristic is also established between the second and fourth beams.

Spatial-Polarization Separation in Vertical Direction

The polarization/separation beamforming module 1230 may set the phases of the input signals to be different from each other in the vertical direction. When the phases of the signals are set differently in the vertical direction, the beams radiated through the quad-polarized antenna module array 1200 may be separated in the vertical direction in space.

Figure 19:
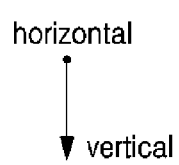
FIGS. 19 to 20 are diagrams for describing spatial-polarization separation in a vertical direction.
Figure 19:
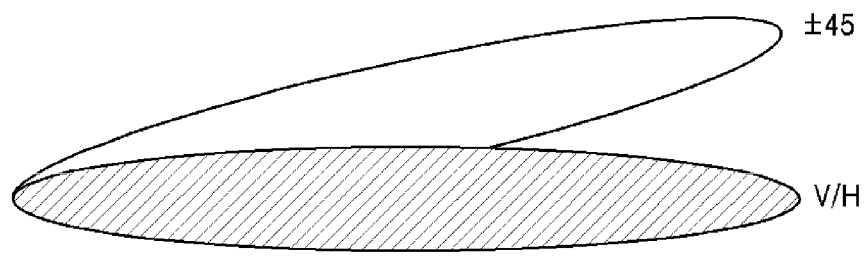

FIG. 19 illustrates the spatial-polarization separation of beams in the vertical direction. A beam having a polarization direction of ±45° represents the first beam, and a beam having a polarization direction of V/H represents the second beam.

Although overlapping regions are present between beams spatially separated in the vertical direction, the polarizations between the beams are different (polarization separation) and thus the problem of the correlation between signals can be resolved.

Spatial-Polarization Separation in Horizontal Direction and Vertical Direction

The spatial-polarization separation in the horizontal direction and the spatial-polarization separation in the vertical direction may be implemented independently of each other or may be implemented together.

In the latter case, the polarization/separation beamforming module 1230 may set the phases of the input signals to be different from each other in the vertical direction and the horizontal direction. For example, the polarization/separation beamforming module 1230 may set the phases of the input signals to be different from each other in the horizontal direction by as many as the number "a" (a is a natural number greater than or equal to 2), and set the phases of the input signals to be different from each other in the vertical direction by as many as the number "b" (b is a natural number greater than or equal to 1).

When the phases of the signals are set to be different from each other by as many as the number "a" in the horizontal direction and different from each other by as many as the number "b" in the horizontal direction, the spatial-polarization separation in the horizontal direction and the spatial-polarization separation in the vertical direction can be simultaneously implemented.

Figure 20:
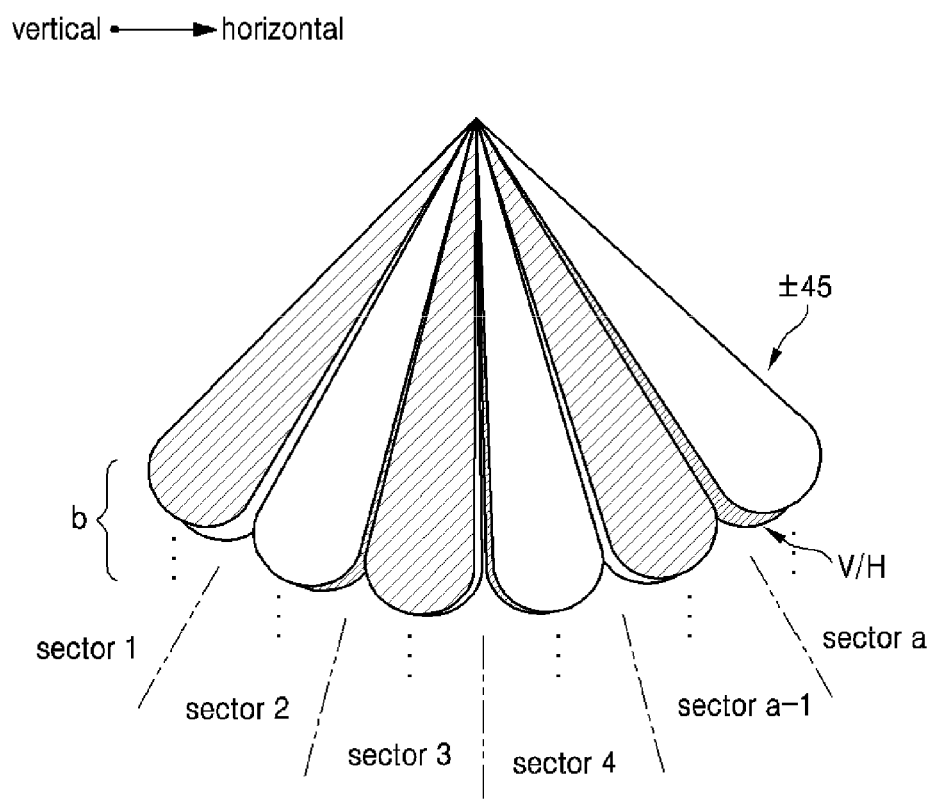

FIG. 20 shows an example in which the spatial-polarization separation in the horizontal direction and the spatial-polarization separation in the vertical direction are simultaneously implemented.

The beams spatially separated in the horizontal direction by as many as the number "a" forms sectors as many as the number "a", and the beams spatially separated in the vertical direction by as many as the number "b" may be formed for each of the sectors. FIG. 20 shows that the same number ("b") of beams are spatially separated in the vertical direction for each of the sectors, but the number of beams spatially separated in the vertical direction may be the same or different for each sector.

Among the beams (beams separated in the vertical direction) generated in sector a, a beam having a polarization direction of ±45° and a beam having a polarization direction of V/H have different polarization directions, and thus the correlation between the two beams can be sufficiently small. In addition, since the beam having the polarization direction of ±45° of sector a and a beam having a polarization direction of V/H of sector a-1 have different polarization directions, a correlation between the two beams can be sufficiently small. Furthermore, the beam having the polarization direction of ±45° of the sector a and a beam having a polarization direction of ±45° of sector 4 have the same polarization direction, but are sufficiently far apart (spaced apart) from each other by the spatial separation in the horizontal direction, thus the correlation between the two beams can also be sufficiently small.

As described above, the antenna device of the present disclosure may configure different polarizations between narrow beams positioned adjacent to each other in space. Therefore, it is possible to improve the correlation between beams, and accordingly to implement polarization reuse.

The spirit of the present embodiments is illustratively described hereinabove. It will be appreciated by those skilled in the art that various modifications and alterations may be made without departing from the essential characteristics of the present embodiments. Accordingly, exemplary embodiments disclosed in the present disclosure are not intended to limit the spirit of the present disclosure, but to describe the spirit of the present disclosure. The scope of the present embodiments is not limited to these exemplary embodiments. The scope of the present embodiments should be interpreted by the following claims, and it should be interpreted that all technical ideas equivalent to the following claims fall within the scope of the present embodiments.

What is claimed is:

1. An antenna device for implementing spatial-polarization separation of beams, the antenna device comprising:
    a quad-polarized antenna module array including a first quad-polarized antenna module and a second quad-polarized antenna module in which signal paths of radiating elements having a same polarization direction are coupled, and configured to radiate a first beam having +45° polarization direction and −45° polarization direction and a second beam having horizontal polarization direction and vertical polarization direction; and
    a polarization/separation beamforming module configured to set phases on signals to be provided to the signal paths so that the first beam and the second beam are spatially separated,
    wherein the first quad-polarized antenna module includes a first radiating element, a second radiating element having a polarization direction orthogonal to the first radiating element, a third radiating element having a difference in polarization direction of 45° with respect to the second radiating element, and a fourth radiating element having a polarization direction orthogonal to the third radiating element, wherein the second quad-polarized antenna module includes a fifth radiating element having the same polarization direction as the first radiating element, a sixth radiating element having the same polarization direction as the second radiating element, a seventh radiating element having the same polarization direction as the third radiating element, and an eighth radiating element having the same polarization direction as the fourth radiating element, wherein the first radiating element and the fifth radiating element are connected to a first transmission line to transmit a first transmission signal and the second radiating element and the sixth radiating element are connected to a second transmission line to transmit a second transmission signal, and the third radiating element and the seventh radiating element are connected to a first reception line to receive a first reception signal and the fourth radiating element and the eighth radiating element are connected to a second reception line to receive a second reception signal.

2. The antenna device of claim 1, wherein the polarization/separation beamforming module sets the phases between the signals to be different from each other in a horizontal direction so that the first beam and the second beam are separated in the horizontal direction in space.

3. The antenna device of claim 1, wherein the polarization/separation beamforming module sets the phases between the signals to be different from each other in a vertical direction so that the first beam and the second beam are separated in the vertical direction in space.

4. The antenna device of claim 1, wherein in the first quad-polarized antenna module, the third radiating element is arranged on an upper side or a lower side of the first radiating element and the second radiating element, and the fourth radiating element is arranged on a right side or a left side of the first radiating element and the second radiating element, and in the second quad-polarized antenna module, the seventh radiating element is arranged on an upper side or a lower side of the fifth radiating element and the sixth radiating element, and the eighth radiating element is arranged on a right side or a left side of the fifth radiating element and the sixth radiating element.

5. The antenna device of claim 4, wherein the first quad-polarized antenna module is arranged on an upper side or a lower side of the second quad-polarized antenna module, and when the fourth radiating element is arranged on the right side of the first radiating element and the second radiating element, the eighth radiating element is arranged on the left side of the fifth radiating element and the sixth radiating element, and when the fourth radiating element is arranged on the left side of the first radiating element and the second radiating element, the eighth radiating element is arranged on the right side of the fifth radiating element and the sixth radiating element.

6. The antenna device of claim 1, wherein in the first quad-polarized antenna module, the first radiating element is arranged on an upper left side or a lower right side of the third radiating element and the fourth radiating element, and the second radiating element is arranged on an upper right side or a lower left side of the third radiating element and the fourth radiating element, and in the second quad-polarized antenna module, the fifth radiating element is arranged on an upper left side or a lower right side of the seventh radiating element and the eighth radiating element, and the sixth radiating element is arranged on an upper right side or a lower left side of the seventh radiating element and the eighth radiating element.

7. The antenna device of claim 1, wherein the first quad-polarized antenna module is arranged so that the first radiating element and the second radiating element intersect each other at a first intersection point, and the third radiating element and the fourth radiating element intersect each other at a second intersection point, and the second quad-polarized antenna module is arranged so that the fifth radiating element and the sixth radiating element intersect each other at a third intersection point, and the seventh radiating element and the eighth radiating element intersect each other at a fourth intersection point.

8. The antenna device of claim 7, wherein the first intersection point is arranged at a same location as the second intersection point, and the third intersection point is arranged at a same location as the fourth intersection point.

9. The antenna device of claim 1, wherein the first transmission signal, the second transmission signal, the first reception signal and the second reception signal are time-multiplexed such that transmission of the first transmission signal and the second transmission signal and reception of the first reception signal and the second reception signal are alternately performed in time.

\* \* \* \* \*